J. V. WASHBURNE.
ERASER.
APPLICATION FILED DEC. 8, 1910.
1,013,575.
Patented Jan. 2, 1912.
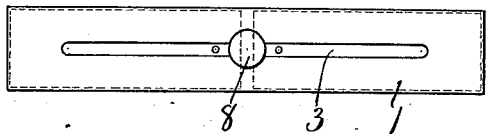
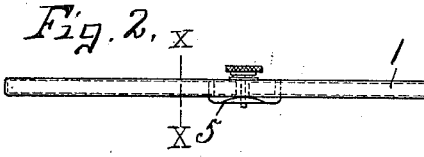
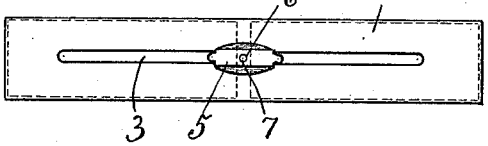
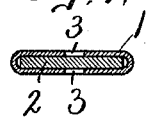 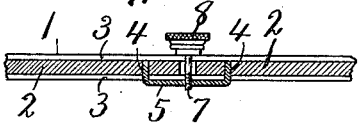
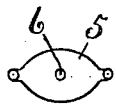
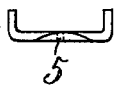
WITNESSES:
Chas. W. Kirschenbaum
Winthrop W. Denison
INVENTOR.
James V. Washburne
By Howard P. Denison ATTORNEY.

UNITED STATES PATENT OFFICE.

JAMES V. WASHBURNE, OF FULTON, NEW YORK.

ERASER.

1,013,575.  Specification of Letters Patent.  Patented Jan. 2, 1912.

Application filed December 8, 1910. Serial No. 596,266.

*To all whom it may concern:*

Be it known that I, JAMES V. WASHBURNE, a citizen of the United States, and resident of Fulton, in the county of Oswego, in the State of New York, have invented new and useful Improvements in Erasers, of which the following, taken in connection with the accompanying drawings, is a full, clear, and exact description.

The object of this invention is to provide an eraser with a simple and inexpensive holder which can be conveniently carried in a pocket and will effectually guard against injury to the rubber and soiling of the same and furthermore will permit of quick and convenient adjustment of the piece of rubber as it becomes worn so as to cause the required amount of rubber to be exposed and whereby the rubber may be practically all used up.

To that end my present invention consists essentially in the combination with a tubular case provided with a longitudinal slot, a piece of rubber fitted in said case and adapted to move longitudinally therein, and means passing through the slot and engaging the piece of rubber for moving the latter as hereinafter more fully described and set forth in the claims.

In the accompanying drawings Figure 1 is a plan view of the eraser embodying my invention; Fig. 2 is an edge view of the same; Fig. 3 is an inverted plan view; Fig. 4 is an enlarged transverse section on the line —X—X— in Fig. 2; Fig. 5 is an enlarged central longitudinal section; Fig. 6 is an enlarged detail plan view of the plate which connects the two pieces of rubber, and Fig. 7 is a side view of the same.

Referring to the drawings like numerals of reference indicate like parts in the several views.

—1— denotes a tubular case constituting the holder of the eraser and is preferably of the form of a flattened tube open at both ends and may be composed of any suitable metal or hard rubber.

—2— denotes the piece of rubber which is of the form of a flat strip fitted comparatively loose in the case and is designed to be moved longitudinally therein whereby the entire piece of rubber may be concealed or shifted so as to be made to project from the end of the case. I prefer to provide two strips of rubber, one constituting a pencil-eraser and the other an ink-eraser. This case is provided in its opposite sides with coinciding longitudinal slots —3—3—, and the two rubber strips —2—2— provided in their adjacent end portions with apertures —4—4— which coincide with the said slots.

To connect the two rubber strips, I provide a plate —5— which is formed with two parallel studs which pass through one of the slots —3— and enter the said apertures. These studs are preferably round in cross-section and are fitted to the said slots so as to travel therein. The central portion of this plate —5— is provided with a screw-threaded aperture —6— which receives a shank —7— of a screw which extends through the other slot —3— of the case and passes between the adjacent ends of the rubber strips —2—2—, said screw being formed with a knurled-head —8— bearing upon the corresponding face of the plate. This head serves as a thumb-piece by means of which the said rubber strips can be readily adjusted so as to cause the required amount of rubber to protrude from the ends of the casing. By tightening the screw the rubber strips are securely clamped in their adjusted positions. The aforesaid plate —5— is somewhat wider than the slot so as to more effectually clamp the rubber strips.

While I have shown the casing as being in the form of a flattened tube, still at the same time it is obvious that it may be of cylindrical form and the cross-sectional shape of the rubber strips may be changed.

What I claim is:

1. An eraser holder comprising a tubular case having opposite sides provided with coinciding lengthwise slots, a plate slidable along one side of the tube and provided with a central threaded aperture and studs at opposite sides of the aperture, said studs projecting through the adjacent slot and into the tube to guide the plate in its longitudinal movement, and a clamping screw passed through both slots and engaged in a threaded aperture in the plate.

2. An eraser holder comprising a flat tubular case open at both ends and having its opposite sides provided with coinciding lengthwise slots, a plate slidable along one of the flat sides of the tube and provided with studs spaced some distance apart and projecting inwardly from the adjacent slot into the tube for interlocking engagement with suitable erasers, and means for holding the plate in operative position on the tube.

3. In an eraser, the combination of a case consisting of a flattened tube and provided in its opposite sides with coinciding longitudinal slots, two flat rubber strips fitted in said case and adapted to be shifted longitudinally therein, the adjacent end portions of said strips being provided with apertures coinciding with the slots of the case, a plate bearing against one side of the case and formed with two parallel studs passing through one of the slots and entering the respective apertures and provided with a central screw-threaded aperture, and a screw extending through the slots and engaging the aperture of the plate and passing between the adjacent ends of the rubber strips, said screw being formed with a head bearing on the opposite side of the case and serving as a thumb-piece for shifting the rubber strips as set forth.

JAMES V. WASHBURNE.

Witnesses:
M. E. DRISCOLL,
C. M. WEST.

Copies of this patent may be obtained for five cents each, by addressing the "Commissioner of Patents, Washington, D. C."